US009284693B2

(12) United States Patent
Tabibnia

(10) Patent No.: US 9,284,693 B2
(45) Date of Patent: Mar. 15, 2016

(54) APPARATUS AND RELATED METHODS OF PAVING A SUBSURFACE

(71) Applicant: Ramin Tabibnia, Los Angeles, CA (US)

(72) Inventor: Ramin Tabibnia, Los Angeles, CA (US)

(*) Notice: Subject to any disclaimer, the term of this patent is extended or adjusted under 35 U.S.C. 154(b) by 19 days.

(21) Appl. No.: 14/253,818

(22) Filed: Apr. 15, 2014

(65) Prior Publication Data
US 2014/0308076 A1 Oct. 16, 2014

Related U.S. Application Data

(63) Continuation-in-part of application No. 13/564,628, filed on Aug. 1, 2012, now Pat. No. 8,550,753, which is a continuation-in-part of application No. 12/732,755, filed on Mar. 26, 2010, now Pat. No. 8,453,391.

(51) Int. Cl.
*E01C 9/00* (2006.01)
*E01C 5/00* (2006.01)
*E04C 1/39* (2006.01)
*F24D 3/12* (2006.01)
*E04B 5/48* (2006.01)
*E04F 15/024* (2006.01)
*F24D 3/14* (2006.01)
*E04D 11/00* (2006.01)

(52) U.S. Cl.
CPC ... *E01C 5/00* (2013.01); *E04B 5/48* (2013.01); *E04C 1/392* (2013.01); *E04D 11/007* (2013.01); *E04F 15/02447* (2013.01); *E04F 15/02452* (2013.01); *E04F 15/02464* (2013.01); *E04F 15/02482* (2013.01); *F24D 3/122* (2013.01); *F24D 3/127* (2013.01); *F24D 3/142* (2013.01)

(58) Field of Classification Search
CPC .......... F24D 3/12; F24D 3/122; F24D 3/127; F24D 3/141; F24D 3/142; E04B 5/48; E04C 1/39; E04C 2/52; E04C 1/392
USPC ............. 52/126.6, 263, 220.2, 220.3, 799.12, 52/660, 673, 177, 630; 404/34, 43; 47/66.5, 86; 165/56, 168; 237/69
See application file for complete search history.

(56) References Cited

U.S. PATENT DOCUMENTS

RE957 E * 5/1860 Titus ................................. 26/31
3,037,746 A * 6/1962 Williams ......................... 165/56
3,040,637 A * 6/1962 Bremshey ....................... 404/21
(Continued)

FOREIGN PATENT DOCUMENTS

DE 3411339 A1 * 10/1985 ............. F24D 19/02
GB 2388181 A * 11/2003
JP 2004198019 A * 7/2004 ................ F24D 3/16

*Primary Examiner* — Robert Canfield
(74) *Attorney, Agent, or Firm* — John K. Buche; Buche & Associates, P.C.

(57) ABSTRACT

Disclosed may be an intermediate surface for supporting a small paver, wherein the surface can also be used to exchange heat with the pavers. In one embodiment, the apparatus may be a hextray defined by a frame with a hexagonal lattice for supporting pavers. The hextray preferably features a tubing track throughout the lattice to accommodate heat exchange tubing. In operation the hextray may be positioned above a pedestal or directly on a subsurface. In embodiment, the hex tray may be outfitted with insulation and a metal plate so that heat may be exchanged with pedestals via fluid passing through tubing installed throughout the hexagonal lattice. In a preferred embodiment, the hextray features a slot in its corners for receiving a locking disk or locking slider.

16 Claims, 17 Drawing Sheets

(56) References Cited

U.S. PATENT DOCUMENTS

| | | | |
|---|---|---|---|
| 3,279,134 A * | 10/1966 | Donovan | 52/126.6 |
| 4,111,585 A * | 9/1978 | Mascaro | 404/70 |
| 4,326,366 A * | 4/1982 | Werner | 52/220.3 |
| 4,584,221 A * | 4/1986 | Kung | 428/44 |
| 4,745,715 A * | 5/1988 | Hardwicke et al. | 52/126.6 |
| 5,078,203 A * | 1/1992 | Shiroki | 165/56 |
| 5,287,649 A * | 2/1994 | Prestele | 47/33 |
| 5,323,575 A * | 6/1994 | Yeh | 52/177 |
| 5,787,654 A * | 8/1998 | Drost | 52/177 |
| 5,788,152 A * | 8/1998 | Alsberg | 237/69 |
| 6,851,236 B1 * | 2/2005 | Harvey | 52/403.1 |
| 7,344,334 B2 * | 3/2008 | Thorkelson | 404/29 |
| D593,220 S * | 5/2009 | Reed | D25/153 |
| 8,128,311 B2 * | 3/2012 | Son et al. | 404/36 |
| 8,128,312 B2 * | 3/2012 | Stuchell | 404/43 |
| 8,752,346 B1 * | 6/2014 | Shaw et al. | 52/220.2 |
| 2009/0139159 A1 * | 6/2009 | Hill | 52/177 |

\* cited by examiner

APPARATUS AND RELATED METHODS OF PAVING A SUBSURFACE

CROSS-REFERENCE TO RELATED APPLICATIONS

This application is a continuation in part of U.S. patent application Ser. No. 12/732,755 (filed Mar. 26, 2010) and U.S. patent application Ser. No. 13/564,628 (filed Aug. 1, 2012). Both applications are entitled "Apparatus for establishing a paver over a subsurface" and are incorporated by reference as if fully set forth herein.

STATEMENT REGARDING FEDERALLY SPONSORED RESEARCH OR DEVELOPMENT

Not applicable.

BACKGROUND OF THE INVENTION

1. Field of Invention

The present application is in the field of methods and apparatus for establishing a level paver surface with heat-exchange functionality.

2. Background of the Invention

Subsurfaces are frequently paved to adjust the aesthetic and/or physical properties of the subsurface. Sometimes, paving is accomplished via placing an array of pavers onto the subsurface. Therefore, a need exists for an apparatus and related methods that facilitate the paving of a subsurface with a paver.

Often, leveling and/or elevation of the paved surface relative to the subsurface are necessary. For instance, raising or elevating the paved surface relative to the subsurface can facilitate drainage of the paved surface or provide for air circulation between the paved surface and the subsurface (e.g., to prevent the buildup or mold or other residue). Furthermore, leveling the paved surface can correct an undesirably irregular or sloped undersurface. As a result, there is a need for an apparatus and related methods which facilitate the elevated and leveled placement of a paved surface onto a subsurface.

Pedestals can be used to elevate a paved surface relative to a subsurface. For instance, in U.S. Pub. App. No. 2013/0219809, we disclosed a pedestal that supports the corners of an elevated paver. Pedestals frequently feature slope compensating mechanisms for leveling the elevated paver surface relative to the subsurface. Two common slope compensating mechanisms are: cooperating twist slope adjustment (see U.S. Pat. Nos. 6,332,292 and 5,442,882); concave/convex interacting surfaces (see e.g., U.S. Pat. No. 3,318,057). Twist slope manipulation only allows for slope adjustment at the paver support surface instead of at the pedestal base whereby the pedestal can become unbalanced. Concave/convex surface slope compensation is not adequate since the concave/convex surface interactions are relatively frictionless and unstable so that additional components are needed to keep the paver support surface from shifting orientation. See U.S. Pat. No. 3,318,057, FIG. 2, element 70; see also U.S. Pub. Pat. App. No. US2008/0222973, FIGS. 4 and 5, element 132, 134 and 72. Accordingly, a need still exists for a pedestal and related methods which facilitate the elevated and leveled placement of a paved surface onto a subsurface.

When pedestals are used for elevation or slope compensation of a paved surface, problems can arise when the pavers are not coupled to the pedestal. For example, a paver can fall or otherwise shift position to increase paver installation time or ruin the paver pattern. Thus, many have designed mechanisms for coupling the paver to a pedestal. In the pedestal disclosed by Knight, III et al. (U.S. Pat. No. 8,302,356), the corners of four wooden pavers are anchored to a support pedestal via a washer that turns into a notch in the pavers' corner. See FIGS. 9-11. This washer features a cut-away portion so that the panels can be unanchored to the pedestal via aligning the cut-away portion with one of the four anchored corners. Problems can arise when the cut-away portion accidentally aligns with one of the paver corners wherein the paver may still be allowed to fall out of place or otherwise misalign. Thus, a need exists for apparatus and related methods of anchoring a paver to a pedestal.

Problems also arise in elevated and slope adjusted paved surfaces when small pavers are used because such small pavers cannot span between two pedestals. As a result, support surfaces are provided between the paver and the pedestal. See, e.g., U.S. Pat. No. 8,128,312. However, intermediate surfaces can be problematic for adding or removing heat from the paver surface. Exchanging heat with a paved surface is sometimes desirable. Heat is frequently provided to cold paved surfaces to melt snow on paved surfaces (e.g., a driveway of a home) in cold environments. Similarly, heat may be removed from a paved surface in hot environments to prevent discomfort to those walking bare-foot on the paved surface (e.g., a pool-side paved surface). As a result, there is a need for a pedestals, intermediate paver support surfaces, and related methods which facilitate the elevated, leveled, heated or cooled placement of a paved surface onto a subsurface.

SUMMARY OF THE INVENTION

It is an object of the present application to disclose apparatus and related methods for facilitating the elevated and leveled placement of a paver array onto a subsurface. In one embodiment, such an apparatus may be defined by two cooperating slope compensation panels that are disposed underneath a paver support pedestal. Each panel has a top surface and a bottom surface, wherein the bottom surface of one panel is configured for receiving the top surface of the other panel, and wherein the top surface is configured to be received by the bottom surface of the other panel or by the bottom of the pedestal. Suitably, the bottom surface of one panel features a slope relative to the top surface of the bottom panel so that the slopes of each panel compound or offset with the relative rotation of each panel with respect to each other. In one mode of operation, (A) the panels may be coupled and rotated relative to each other to compensate for a slope of an undersurface and (B) a pedestal may be positioned on the panels so that the pedestal's paver support surface is level relative to the subsurface.

It is also an object of the present application to disclose an anchoring mechanism for securing a paver to a pedestal. In one embodiment, the apparatus is a locking disk that may be positioned at the corners of a plurality of pedestals and inserted into a disk slot through the corners. In a preferred embodiment, the locking disk is a full circle that features a perforated break-away to assist in the unanchoring of the pavers whenever necessary. In operation, the locking disk works similar to the apparatus disclosed in by Knight, III et al. (U.S. Pat. No. 8,302,356) except the pavers are anchored with a full disk without a cutout. In another embodiment, the apparatus is a locking slider that may be positioned between two pavers and slid into slots in the corners of the two pavers, and then slid backward into so that the slider is positioned in the slot of four paver corners.

Finally, it is an object to provide an intermediate surface for supporting a small paver and that can also be used to exchange heat with the payers. In one embodiment, the apparatus may be a hextray defined by a frame with a hexagonal lattice for supporting pavers. The hextray preferably features a tubing track throughout the lattice to accommodate heat exchange tubing. In operation the hextray may be positioned above a pedestal or directly on a subsurface. In embodiment, the hex tray may be outfitted with insulation and a metal plate so that heat may be exchanged with pedestals via fluid passing through tubing installed throughout the hexagonal lattice. In a preferred embodiment, the hextray features a slot in its corners for receiving a locking disk or locking slider.

Other objectives and desires may become apparent to one of skill in the art after reading the below disclosure and viewing the associated figures.

BRIEF DESCRIPTION OF THE FIGURES

The manner in which these objectives and other desirable characteristics can be obtained is explained in the following description and attached figures in which.

It is to be noted, however, that the appended figures illustrate only typical embodiments of the disclosed assemblies, and therefore, are not to be considered limiting of their scope, for the disclosed assemblies may admit to other equally effective embodiments that will be appreciated by those reasonably skilled in the relevant arts. Also, figures are not necessarily made to scale.

DETAILED DESCRIPTION OF PREFERRED EMBODIMENTS

Disclosed may be an apparatus and related methods for facilitating the elevated and leveled placement of a paver array onto a subsurface. In one embodiment, such an apparatus may be defined by two cooperating slope compensation panels that are disposed underneath a paver support pedestal. Each panel has a top surface and a bottom surface. Suitably, the bottom surface of a top panel features a slope relative to the top surface of a bottom panel so that the slopes of each panel compound or offset via the relative rotation of each panel with respect to each other. In one mode of operation, (A) the panels may be coupled and rotated relative to each other to compensate for a slope of an undersurface and (B) a pedestal may be positioned on the panels so that the pedestal's paver support surface is level relative to the subsurface. The details of the preferable panel are best disclosed by reference to FIGS. 1 through 10.

It should be noted that, now, and throughout the application the terms "top" and "bottom" or "lower" and "upper", or any other orientation defining term should in no way be construed as limiting of the possible orientations of the panel 1000 (i.e., the panel 1000 may be positioned sideways, or in reversed vertical orientations even though the specification refers to a "top" and "bottom" parts).

Figure 1:
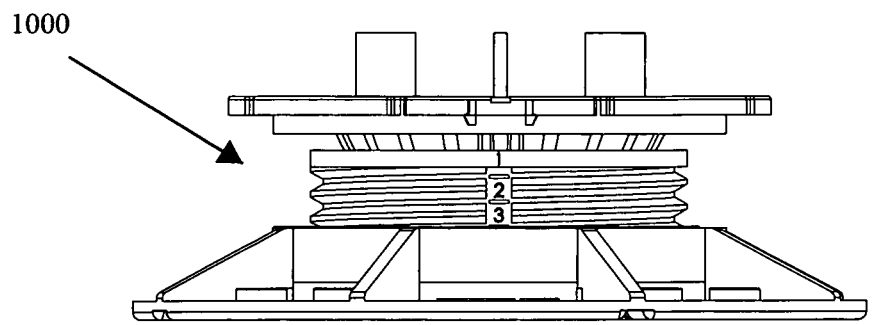
FIG. 1 is a pedestal 1000.

FIG. 1 is a pedestal 1000 for elevating a paver surface. The pedestal 1000 is disclosed in U.S. Pub, App. No. 2013/0219809, and that document is hereby incorporated in its entirety. As disclosed in that document, the pedestal 100 has a slope compensation mechanism at its paver support surface, but not its base. In one embodiment, the disclosed apparatus is slope compensation disk that, when staked with a like disk, provides a footing for a pedestal that is configured to compensate for the slope of the subsurface.

Figure 2:
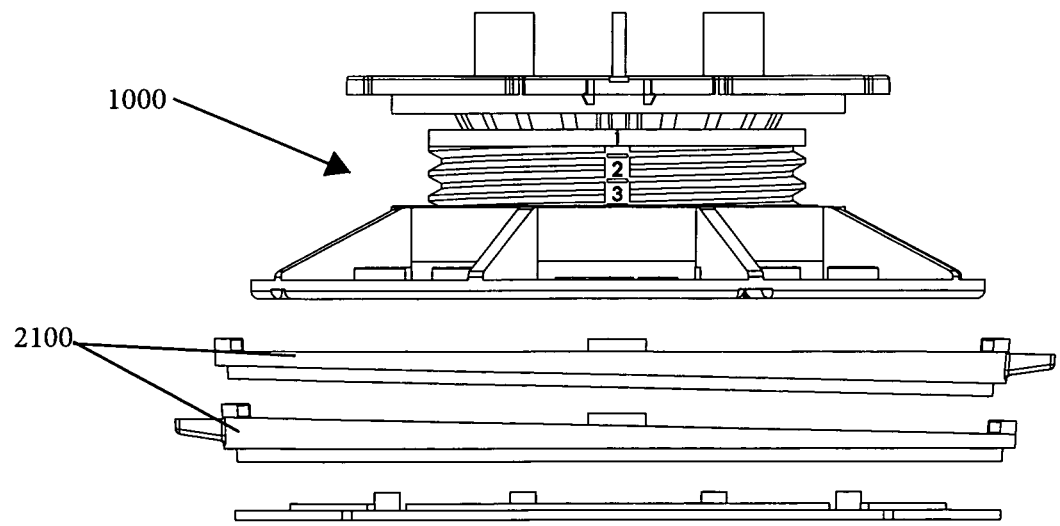
FIG. 2 is an exploded view of the pedestal 1000 over a base and two slope compensation panels 2000.
Figure 3:
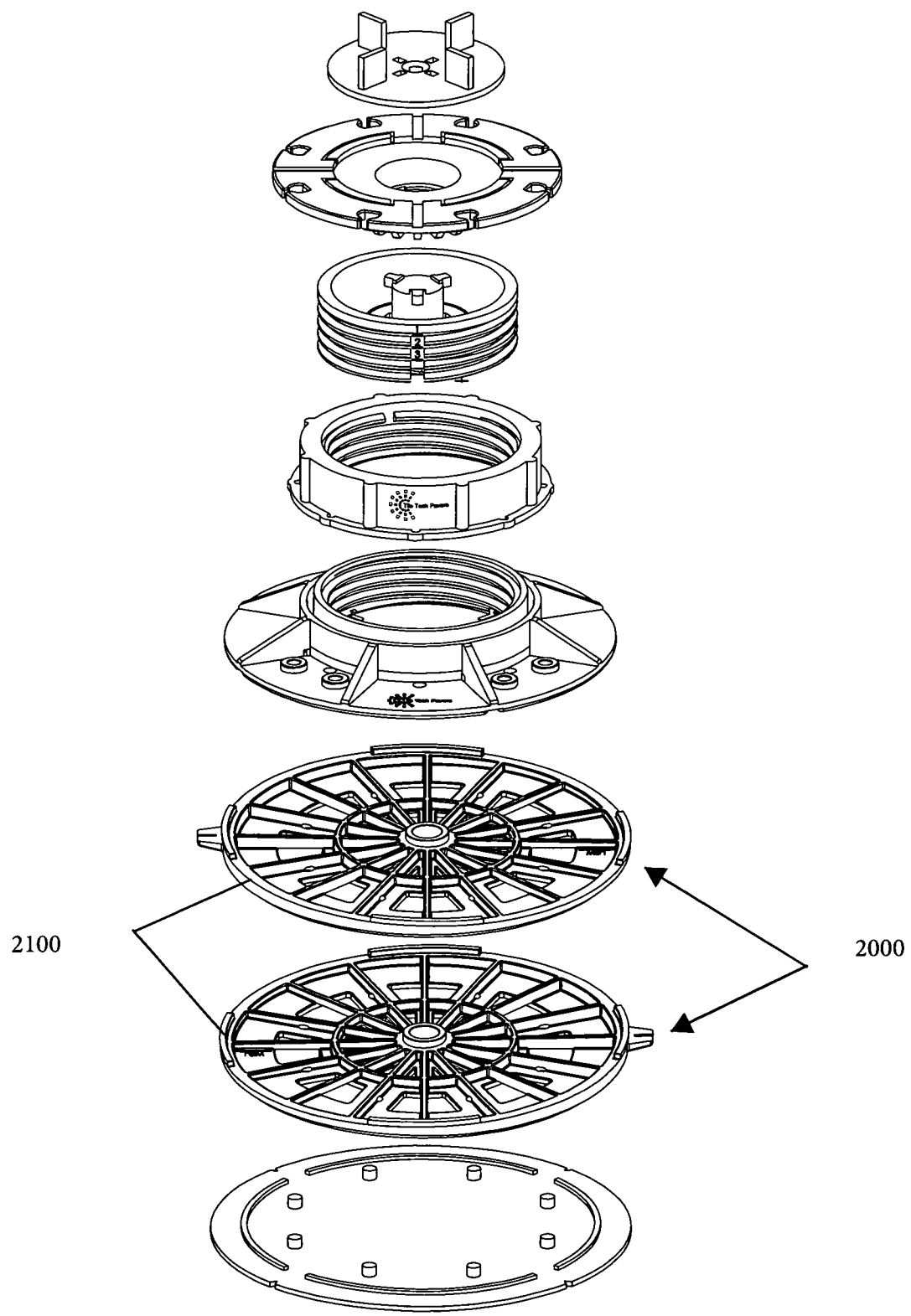
FIG. 3 is an exploded view of the pedestal 1000 and the slope compensation panels 2000.
Figure 4:
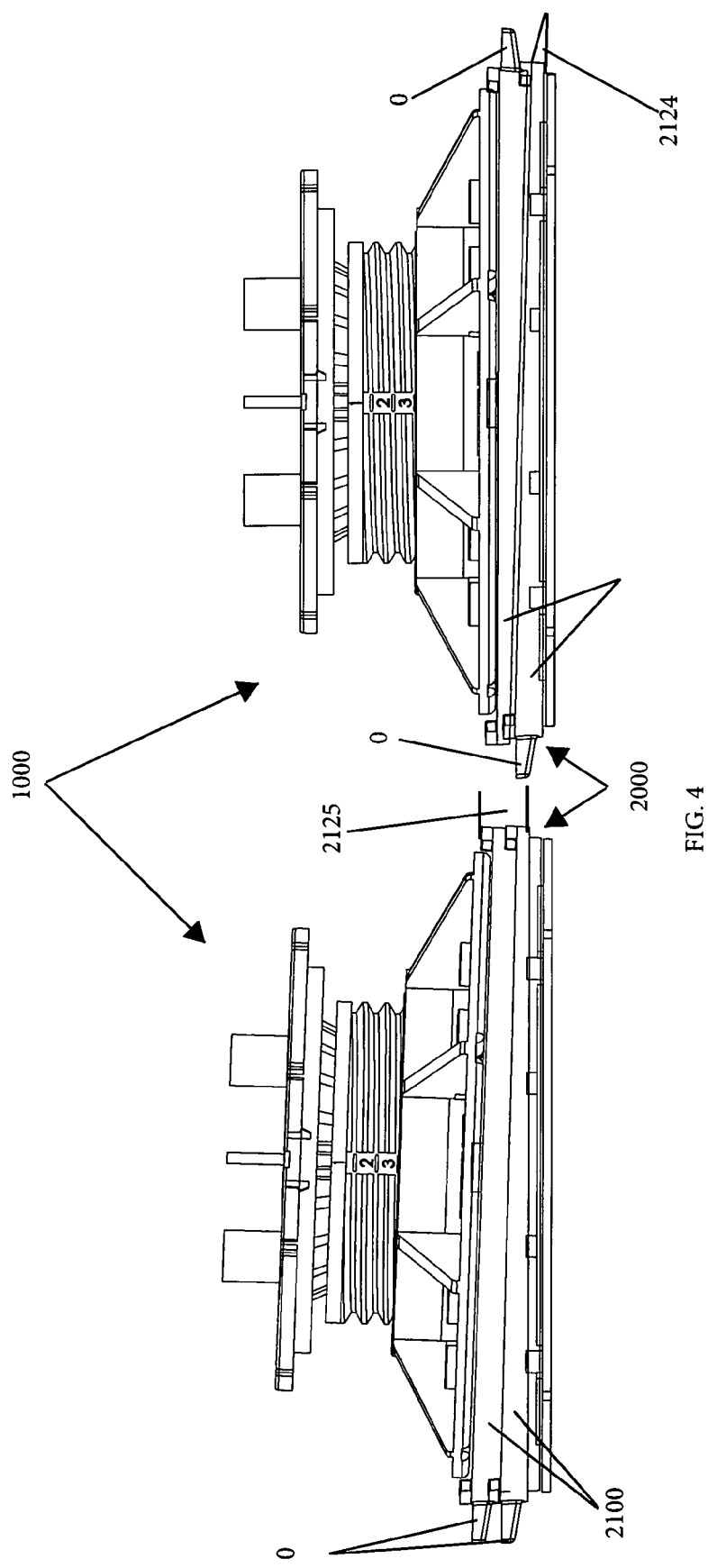
FIG. 4 is a side-by-side view of a pedestal and a slope compensated pedestal.

Referring now to FIG. 4, the pedestal 1000 may be positioned on a slope compensation pad 2000 defined by two or more slope compensation disks 2100. FIGS. 2 and 3 illustrate how two panels might be stacked. As alluded to above, the panels 2100 are configured with a top surface plane that is angled relative to the plane of its bottom surface. The top surface plane of a first panel 2100 may interact with a bottom surface plane of a second panel to result in the compounding or offsetting of panels 2100 respective angle. As shown in the figure, the pedestal 1000 on the right is on a pad 2000 that has the angles of its panels 2100 offset while pedestal 1000 on the left is on a pad 2000 that has had the angles of the stacked panels 2100 compounded. FIG. 2 is a side view of the pedestal 1000 being positioned over two slope compensation panels 2000.

Figure 5:
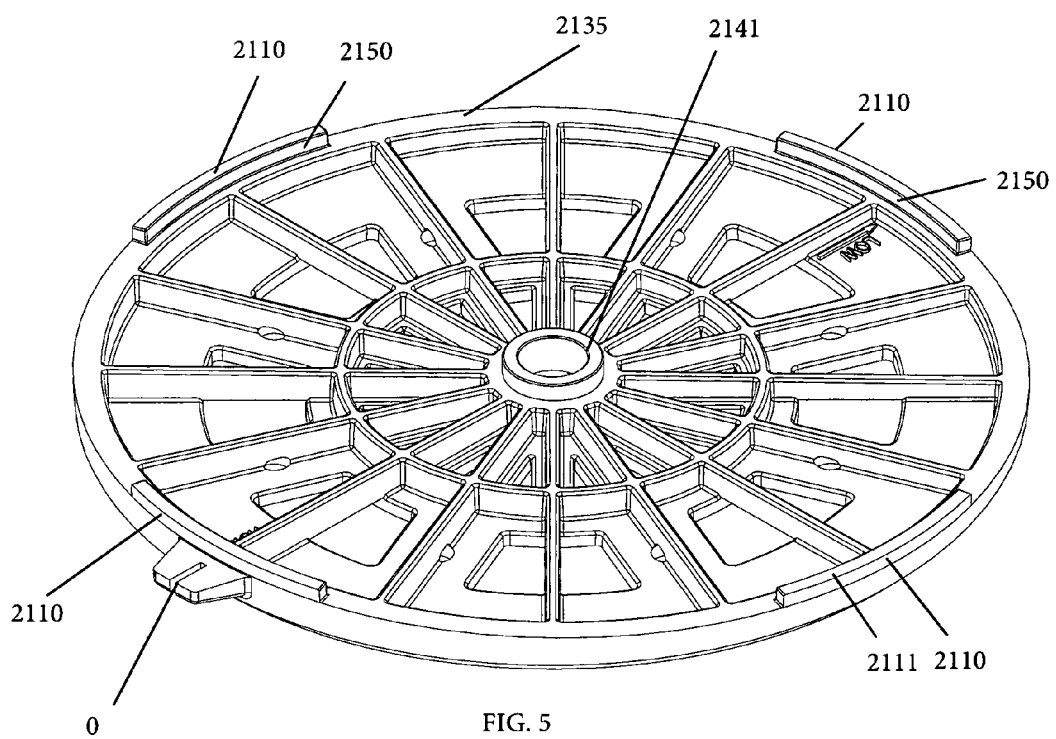
FIG. 5 is a top perspective of a slope compensation panel 2000.
Figure 6:
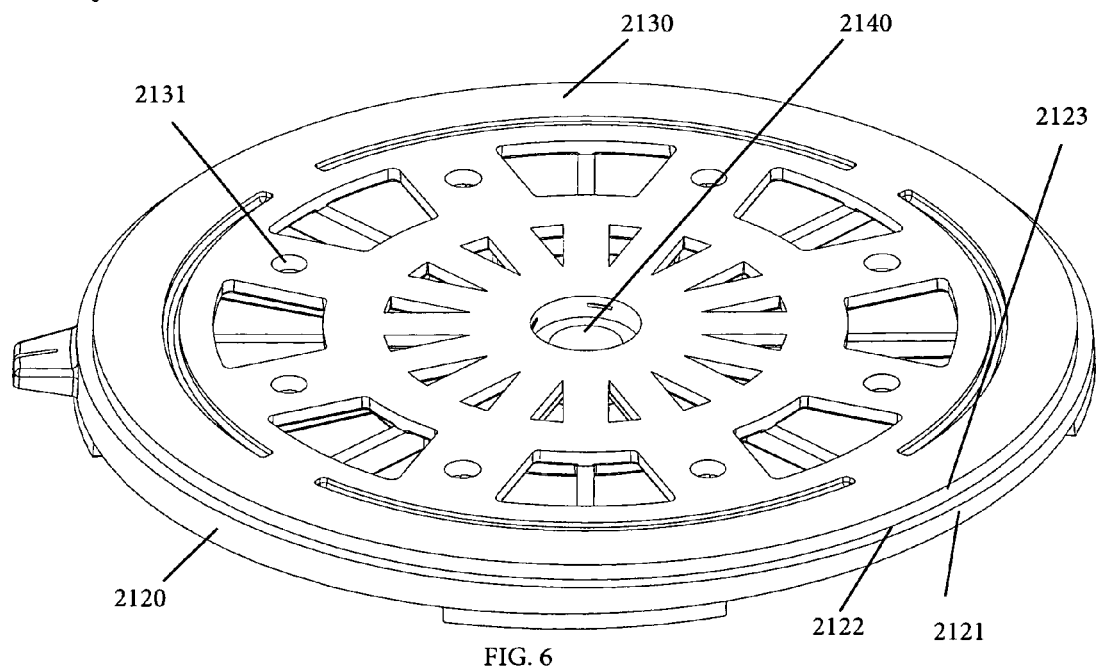
FIG. 6 is a bottom perspective of a slope compensation panel.
Figure 7:
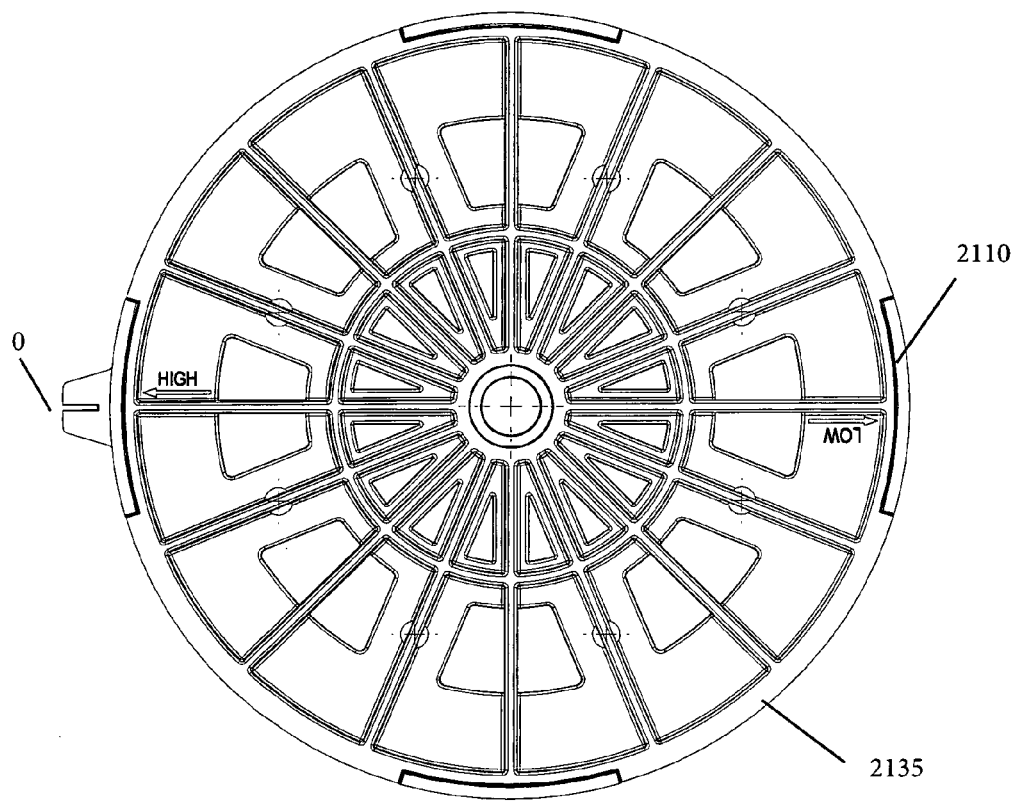
FIG. 7 is a top view of the slope compensation panel
Figure 8:
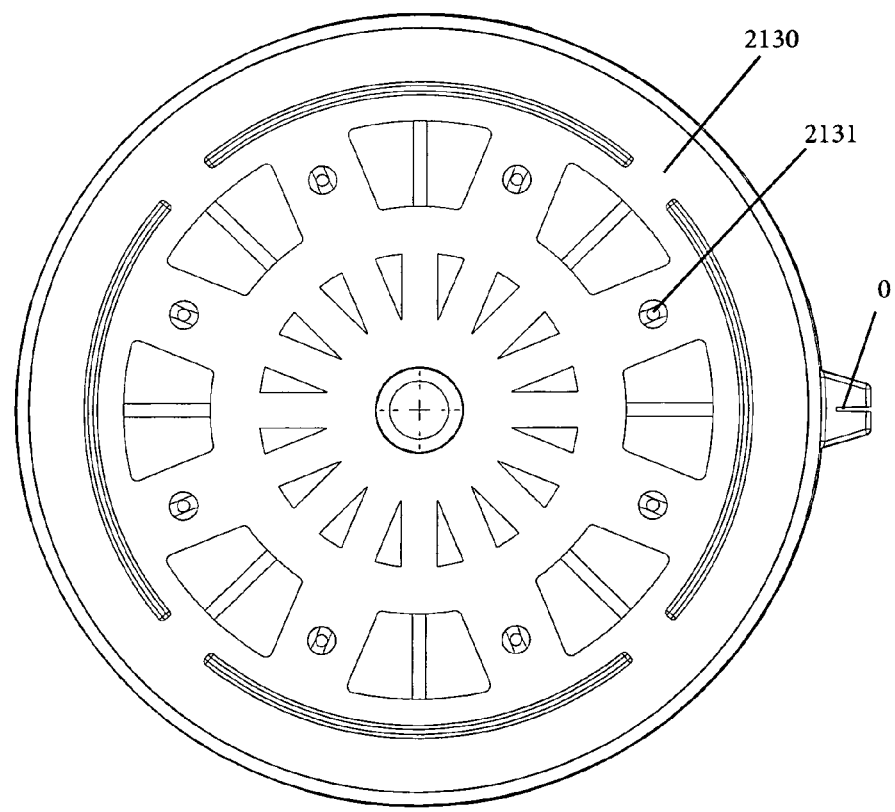
FIG. 8 is a bottom view of the slope compensation panel.

FIGS. 5 and 6 respectively depict bottom and top perspective views of the slope compensation panel 2100. FIGS. 7 through 10 respectively depict top, bottom, left side, and right side view of the compensation panel 2100. As can be seen in the referenced drawings, the panel 2100 is generally a truncated tubiform and may comprise: feet 2110; an outer wall 2120; an established surface 2130 on at least a part of one end of the truncated tubiform; an established surface 2135 on the underside of the panel 2100; an attachment receptacle 2140 on the surface 2130; an inner wall 2150 accessible at the unclosed end of the component's 1 truncated tubiform; and the underside 2160 of the surface 2130. FIGS. 5 through 10 suitably illustrate the above referenced components of the depicted panel 2100.

The feet 2110. The feet 2110 are best depicted in FIGS. 5, 6, 7, 9, and 10. As seen in the cited figures, the feet 2110 may generally be a rim or portion thereof or distal projection around the open end of the panels 2100 truncated tubiform. As such, the feet 2110 feature lower 2112 (see FIG. 7) surfaces. Operably, the feet 2110, via the lower surface 2112, may uprightly support a panel 2100 on a subsurface when such is positioned with its open end against the subsurface. In an alternate embodiment (see, e.g., FIG. 4, the feet 2110 may be positioned on a base plate). Further, as discussed below, because the panel 2100 is configured to receive/retain items within its tubiform, the foot 2100 may further define a gripping means for facilitating the receipt/retention and/or removal of such items.

Figures 9, 10:
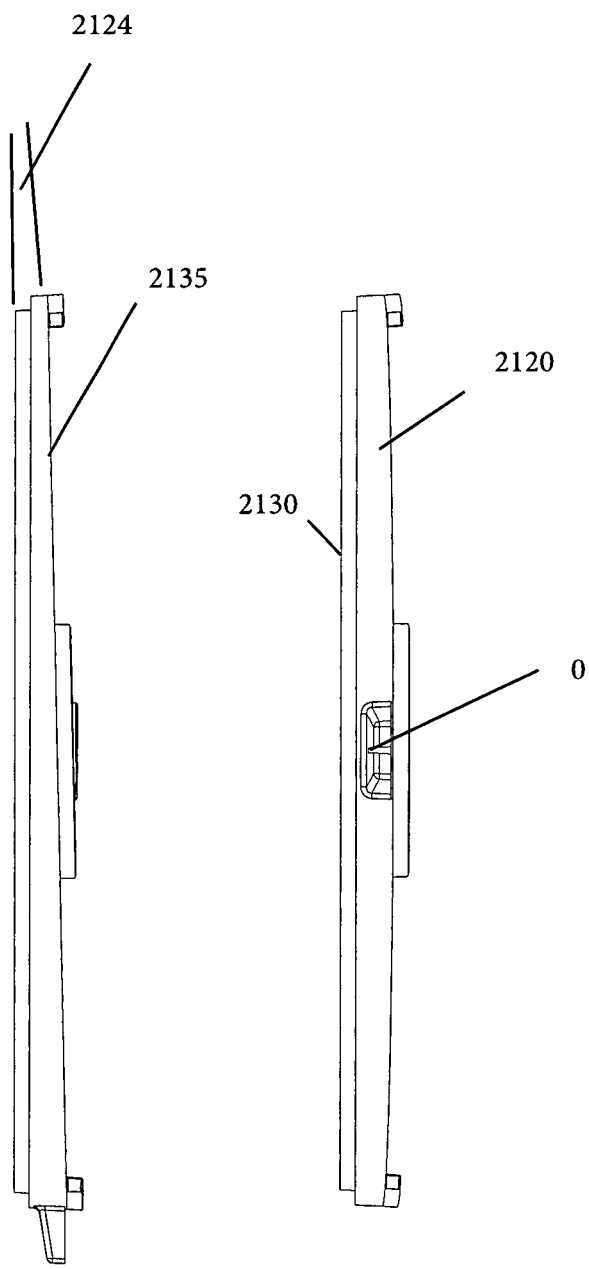
FIG. 9 is a side view of the slope compensation panel.
FIG. 10 is a rear-view of the slope compensation panel.

The outer wall 2120. The outer wall 2120 is best depicted in FIGS. 5, 6, 9 and 10. As seen in the figures, the outer wall 2120 may suitably be the external portion of the component's tubiform. As such, the outer wall 2120 generally extends between the foot 2110 and the surface 2130. As is further depicted, the outer wall 2120 is suitably divided at a midpoint by a step 2122 into lower 2121 and upper 2123 sections. As seen in FIGS. 9 and 10, the upper portion 2123 is offset from the lower portion 2121 in terms of the component's external diameter to generally define the step 2122 (see also FIG. 5). As further seen in FIGS. 5, 9, and 10, the step 2122 generally defines a plane that is oblique to the plane of the bottom surface 2135. The oblique angle is generally referenced by angle 2124. Preferably, the step 202 is disposed on the outer wall 200 at a location that is more toward the surface 2130 end of the panel 2100, but the plane of the surface 2130 should suitably be above the plane of the step 2122 and the plane of the under surface 2135.

When a panel is used in isolation, as discussed further below, the top surface 2130, the step 2122, and undersurface 2135 suitably serve only aesthetic purposes. However, when used in conjunction with a like panel 2100 (i.e., more than one panel 2100) the step 2122 and surface serves as a means for altering the slope of the surface 2130 with respect to a subsurface. This functionality is discussed later below.

The to surface 2130 and bottom surface 2135. The top and bottom surfaces 2130, 2135 are best seen in FIGS. 5, 6, 7, and 8. Referring to these figures, the surface 2130 generally encloses one end of the component's 1 tubiform to establish a load bearing surface. The bottom surface, 2135 generally defines a plane on the bottom of the panel 2100. Operably, the surface 2130 is adapted for receiving a pedestal (see e.g., FIG. 2) whereby the pedestal is supported above a subsurface by the panel. For example, a panel 2100 used in isolation may, after being placed feet 2110 down on a subsurface or base plate, receive a pedestal, on its surface 2130 whereby the paver is above the subsurface.

The attachment receptacle 2140. Referring now to FIGS. 5, 6, 7 and 8, the surface 2130 features at least one mortise 211 and an attachment receptacle 2140. The mortise 2131 is generally an aperture or depression around the periphery of the surface 2130. The mortise 2131 are generally for receiving a corresponding tennon for securing a pedestal to the top surface 2130. The attachment receptacle 2140 is generally a larger, central depression or aperture. The attachment receptacle 2140 is generally for receiving a corresponding extension 2141 from the bottom surface 2135 of a panel that has been stacked on the top surface.

The inner wall 2150. The inner wall 2150 is best viewed in FIG. 6. As seen in the figures, the inner wall 2150 may suitably be the internal portion of the panel's 2100 tubiform. As such, the inner wall 2150 generally extends internally between the foot 2110 and the underside 2135 of the surface 300. As further depicted in the figures, the inner wall 2150 ends at the bottom surface 2135. As further seen in FIGS. 5, 6, 7, and 8 the bottom surface 2135 generally defines a plane that is oblique to the plane of the foot surface 102 and the plane of the top surface 2130. The oblique angle has generally been identified by angle 2124. Preferably, the plane of the feet surface 2111 should suitably be below the plane of the bottom surface 2135.

FIG. 4 depicts two like panels coupled in stacked configurations. The panel 2100, as best seen in FIG. 6, features a receptacle which is generally defined by the inner wall 2150 and is adapted to femininely receive the surface 2130 end of a like panel 2100 until the bottom surface of the receiving panel (2135) interfaces with the top surface 2135 and the feet 2110 interface with the step 2122 of the inserting panel 2100. Referring still to FIG. 4 through 10, the orientation of the interface of the upper and lower surfaces 2130 and 2135 may be manipulated to change the slope of the top surface 2100 of the receiving panel 2100 with respect the feet plane 2111 of the lower panel 2100. The stated change in slope can be viewed by comparing the rotated pad 2000 of FIG. 4.

Referring first to FIG. 4, the upper and lower panels 2100 on the right are oriented with respect to one another whereby the angles 2124 of the panels are approximately alternate interior angles with respect to the panel interface, the surface 2130 of the upper panel 2100, and the lower surface 2111 of the bottom panel. (i.e., the surface 2130 of the upper panel and the lower surface 2111 of the feet of the bottom panel are parallel and the concentric axes of the panels are aligned). The pedestal on the right of FIG. 4, can generally be obtained by identifying an origin point 0 on the pedestal of both panels and subsequently stacking the components whereby the origin 0 on the first panel 2100 is diametrically opposite (one-hundred and eighty degrees around the axis of the insertive panel 2100) to the origin 0 of the second panel. Further, the angle 2125 in this configuration is suitably zero degrees whereby the surface 2130 of the receiving panel is parallel with the feet surface 2111 of the inserting panel 2100.

Referring now to the left side of FIG. 4, the receptive and insertive panels 2100 are oriented with respect to one another whereby the angles 2124 of the insertive and receptive components 1A and 1B compound (i.e., have the same vortex point and share a common reference plane). The above described second configuration typically occurs when the origin point 0 on the first panel is aligned with the origin point 0 on the second panel as depicted on the left in FIG. 4. Further, the angle 2125 in this configuration is suitably the sum of angles 2124.

Preferably, rotating the first panel around the axis of the second panel along the interface of the upper and lower surfaces 2130, 2135 of the panels and between the above-identified configurations (i.e., rotating the origin of the first panel with respect to the axis of component 1B) will vary the size of the angle 2125 between the upper surface 2130 of the upper panel and the relative horizontal. Suitably, a maximum degree for the angle 2125 will be obtained in the identified left configuration of FIG. 4, a zero degree will be obtained as identified in the right configuration of FIG. 4, and an intermediate angle may be elected via positioning the origin of the first panel between zero or one hundred eighty degrees relative to the origin and axis of the second component. Referring again to FIGS. 9 and 10, in the present embodiment the angles 2124 are approximately 1 degree whereby the angle 2125 may vary from between 0 and two degrees. Subject thereto, the angles need not be limited to 1 degree, but rather it is preferable that the angles be in a range of about 0 to 5 degrees whereby the resulting angle 2125 may be selected to between a range of about 0 and 10 degrees depending on the circumstances.

The components of the pad 2000 being or composing a paver load bearing apparatus, slipresistant mechanism, noise dampening mechanism, and protective buffering to the substrate, should preferably be fashioned out of materials that are capable of these functions. As the weight of a paver may vary from extraordinarily heavy to very light, the materials which may be acceptable for fabricating the components will typically vary according to the applicable paver to be supported thereon the pads. Depending on the circumstance, such materials will be readily known to one of skill in the art, and may include, without being limited to: plastics, polymers, PVC, polypropylene, polyethylene; metals; woods; ceramics; composites and other synthetic or natural materials whether molded, extruded, stamped or otherwise fabricated.

Similarly, the components of the assemblies being or composing a paver load bearing apparatus should preferably be dimensioned to a size that renders the assemblies capable of retaining a paver. As the size of a paver may vary from big to little, the physical dimensions of the components will typically vary according to the applicable paver to be supported thereon the apparatus. Depending on the circumstance, such dimensions will be readily known to one of skill in the art, and may include, without being limited to a cap having an diameter spanning of 1.36 inches. The dependence of the size and dimensions of the component apply equally well to the other aspects and parts of this disclosure.

A slope compensation pad 2000 comprised of an above disclosed panels may be used to compensate for variations in the slope of the undersurface with regard to the leveling of a paver surface via a pedestal. For example, the method may comprise the following steps: obtaining a plurality of components comprising a structure having an undersurface and a top surface, said under surface configured to interface with the top surface of a like component; insertably coupling two of said components whereby the under surface of the receptive component interfaces with the top surface of the insertive component; manipulating the orientation of the insertive component with respect to the receptive component along the interface; and, providing a pedestal to the support surface.

As alluded to above, the disclosed assembly may used for establishing a level paver surface over a sloped subsurface. FIG. 21A depicts a side view of the assembly 2000 and illustrates one mode establishing such leveled surface. Referring first to FIGS. 21A and 21B, the threaded insert 3200 suitably features a concave surface 3240 and the cap 3200 suitably features a convex surface 3230 whereby the slope of the paver support surface 3230 may be skewed in any direction relative to the plane of the foot 3110 of the base 3100 via sliding the convex surface 3230 of the cap 3200 along the concave surface 3240 of the insert 3200. In one embodiment, the paver support surfaces 3210 of four assemblies 4000 positioned at the four corners of a square paver will self level with respect to one another under the weight of the pavers installed thereon the assemblies 2000.

Figure 11:
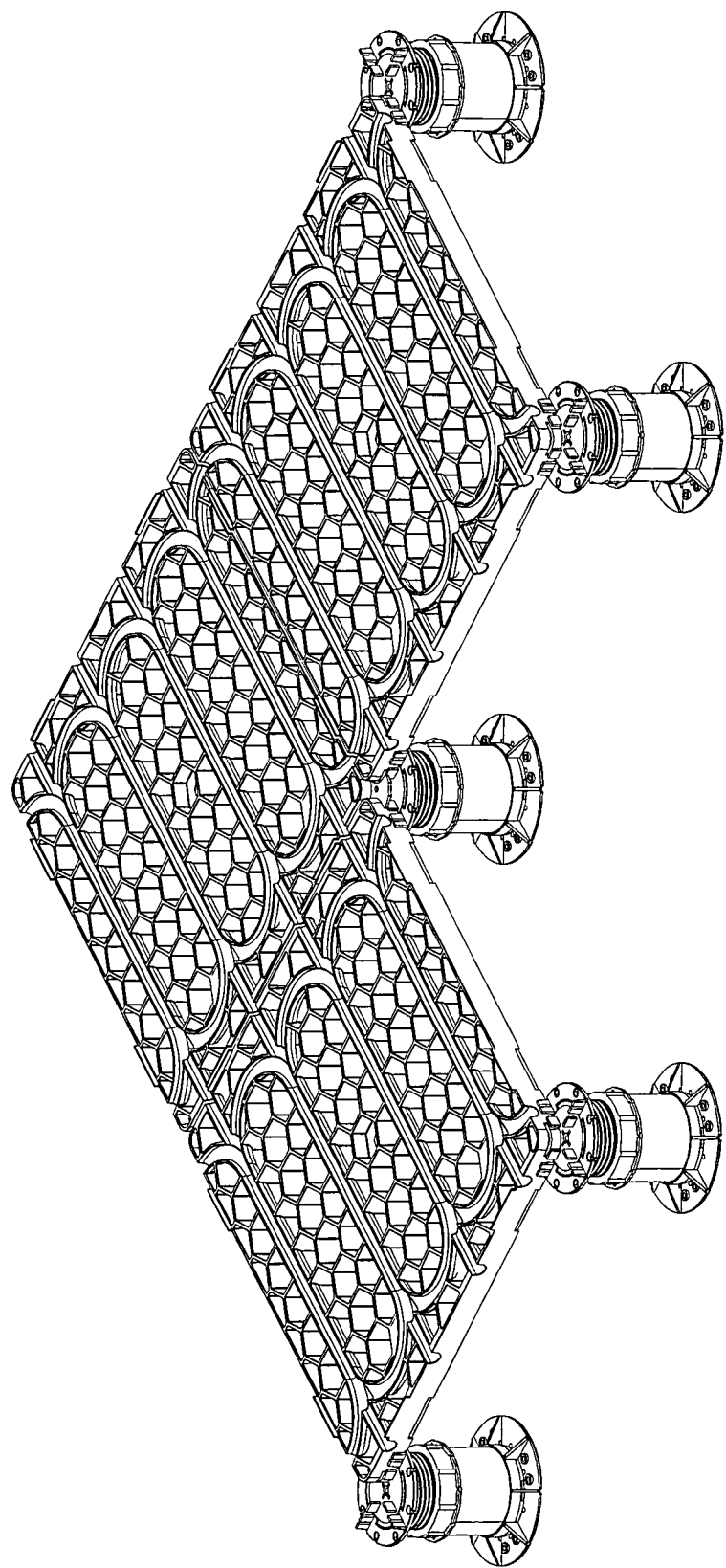
FIG. 11 is an environmental view of a pedestal array supporting a paver support panel.
Figure 12:
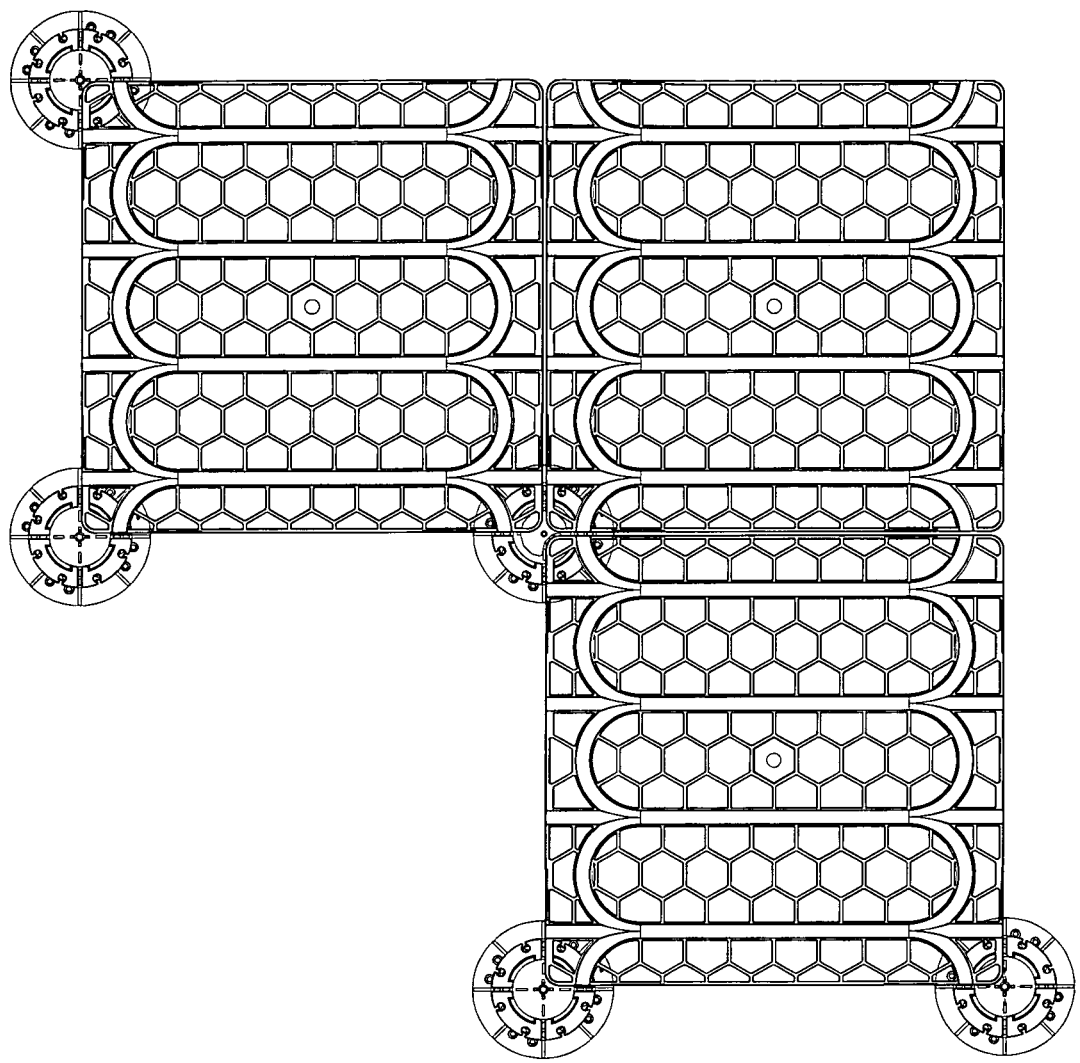
FIG. 12 is a top view of FIG. 11.
Figure 13:
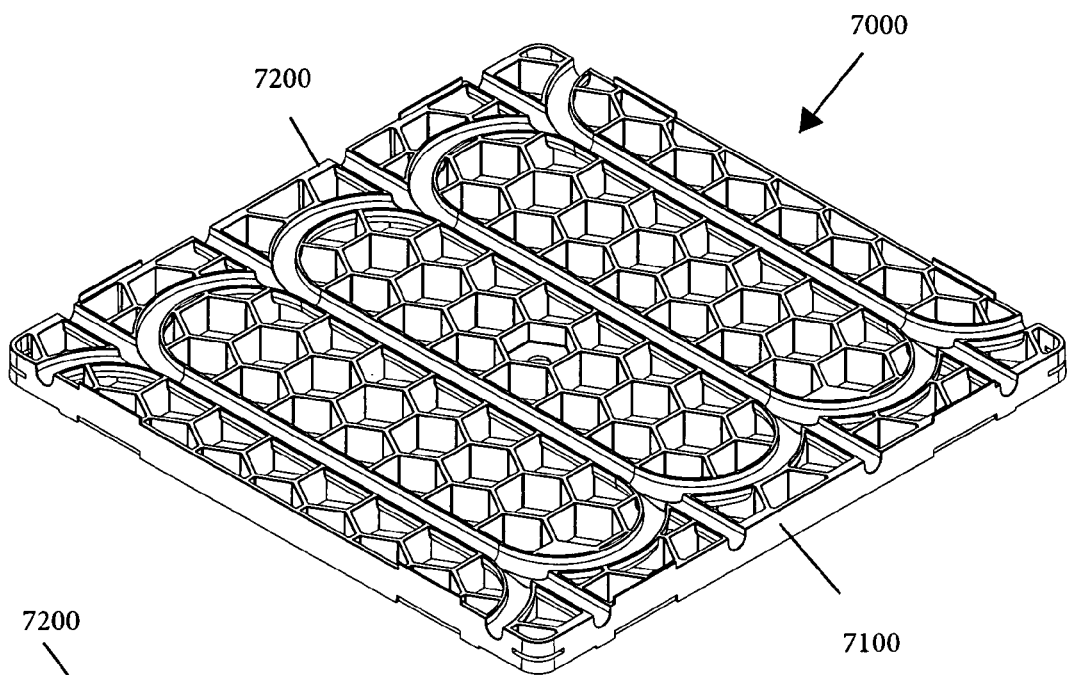
FIG. 13 is a perspective view of a paver support panel.
Figure 14:
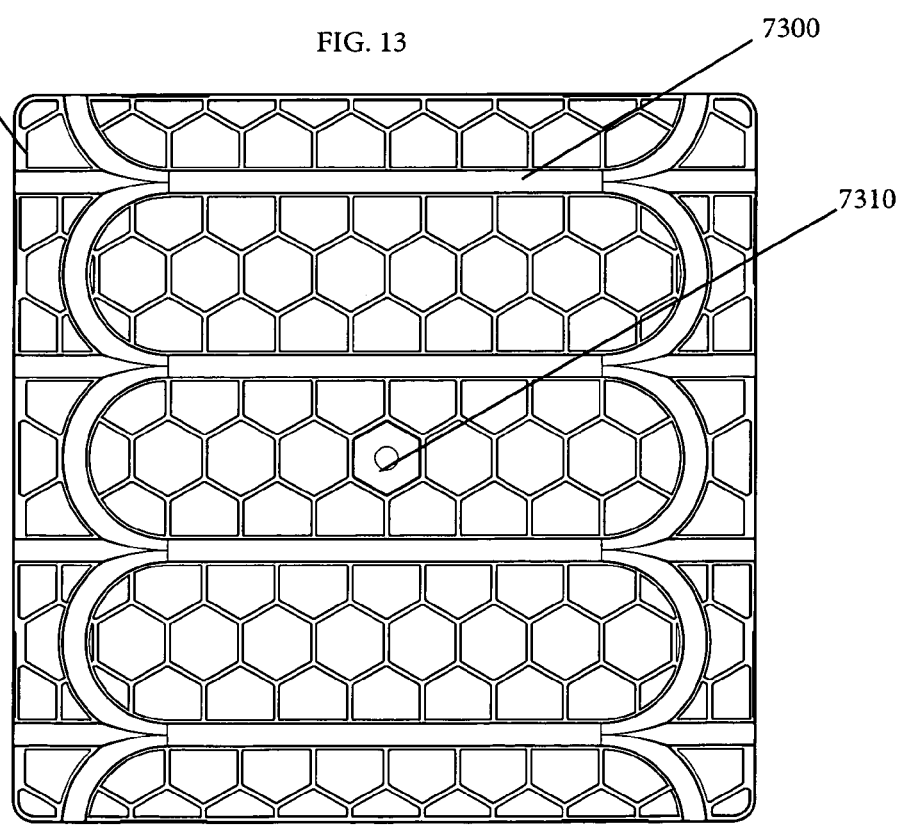
FIG. 14 is a top view of the paver support panel.

FIGS. 11 and 12 depict a plurality of hextrays 7000 installed on top of a plurality of paver pedestals. FIG. 13 is a perspective view of a hextray 7000, which is an intermediate paver support surface. FIG. 14 is a top view of the hextray 7000 of FIG. 13. In operation, a hextray 7000 may be provided to a paver pedestal in the manner of a large paver and as shown in FIGS. 11 and 12 and small pavers deposited thereon in an array. In an alternate embodiment, the hextray 7000 may be placed directly on the subsurface to provide a larger footprint for said small pavers.

Figure 14A:
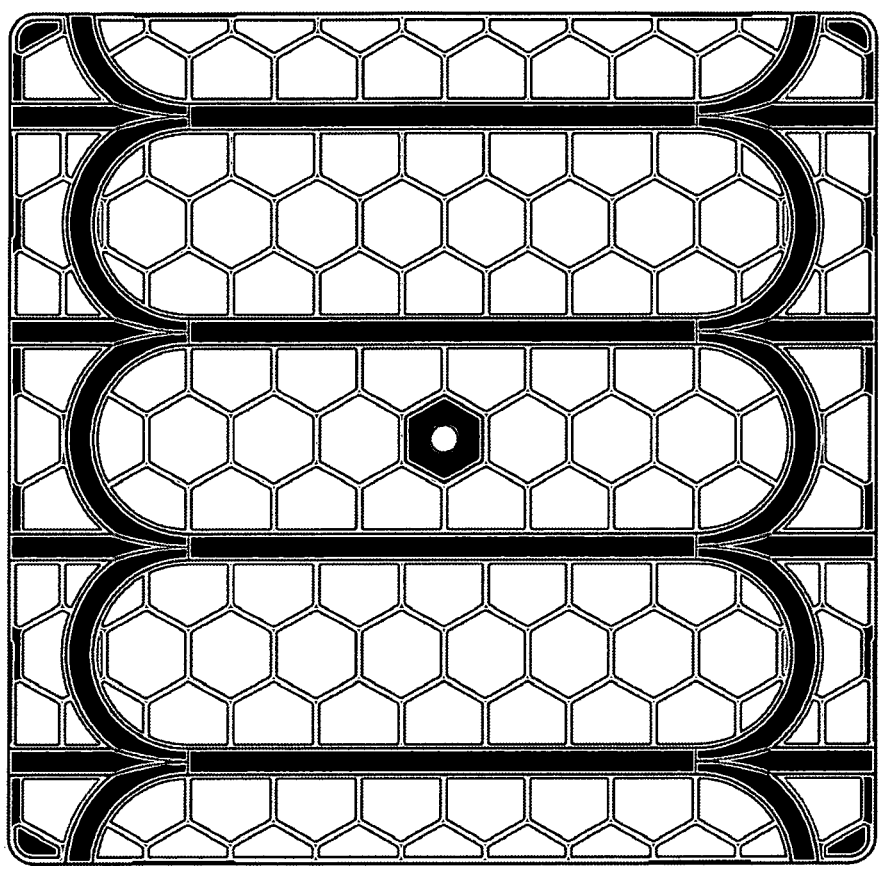
FIG. 14A is a top view of the paver support panel.
Figure 19:
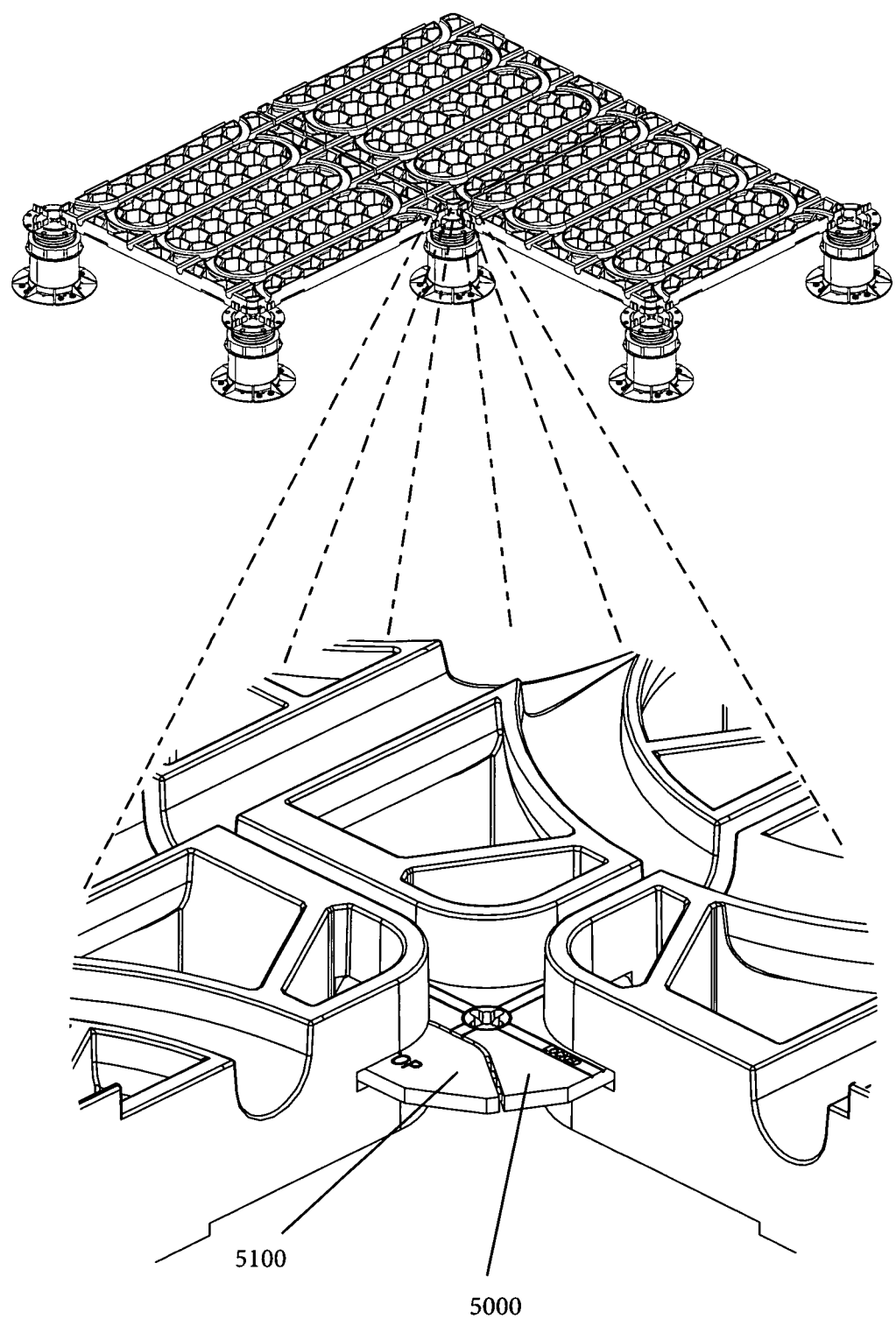
FIG. 19 is an environmental view of a locking disk.

Referring to FIG. 13, the hextray 7000 is generally square and defined by a frame 7100 and a hexagon lattice 7200. As shown in FIGS. 13 and 14, the hextray 7000 features a tubing track 7300 and all of the hexagons in the hexagon lattice 7200 define an aperture through the hextray 7000 except the center hexagon 7310 (See the shaded portion of FIG. 14A). In one embodiment, the frame 7100 has holes or other apertures in its corner for securement to a pedestal as described in U.S. Pat. No. 7,140,156 (issued Nov. 28, 2006). As discussed later, each corner of the hextray 7000 features a slot for receiving a locking disk or a locking slider (see FIG. 19).

It should be noted: although the locking hextray 7000 is depicted as a square, any number of suitable shapes may be used. Such shapes will be known by those of skill in the art, and may include, but should not be limited to, squares, rectangles and other quadrilaterals. Also, the hextray should be constructed of suitable material. Such materials will be readily known to one of skill in the art, and may include, without being limited to: plastics, polymers, PVC, polypropylene, polyethylene; metals; woods; ceramics; composites and other synthetic or natural materials whether molded, extruded, stamped or otherwise fabricated. Finally, it should further be noted that, the dimensions of the hextray 7000 will vary with the size of the paver to be retained by the pedestal. In particular, the height of the projections may vary depending on the thickness of a paver, e.g. in a range of about 0 to 100 inches.

Figure 15:
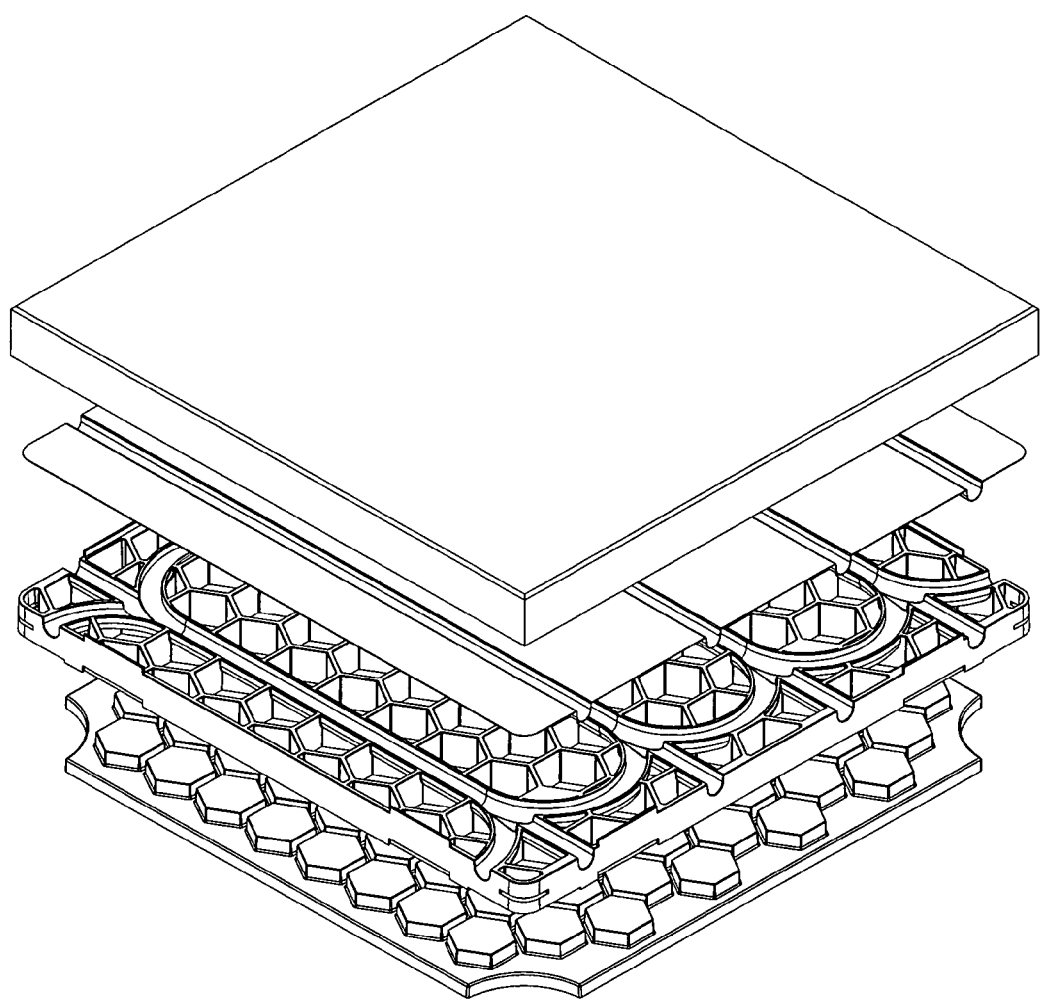
FIG. 15 is an exploded view of a heat exchanger paver support panel.
Figure 16:
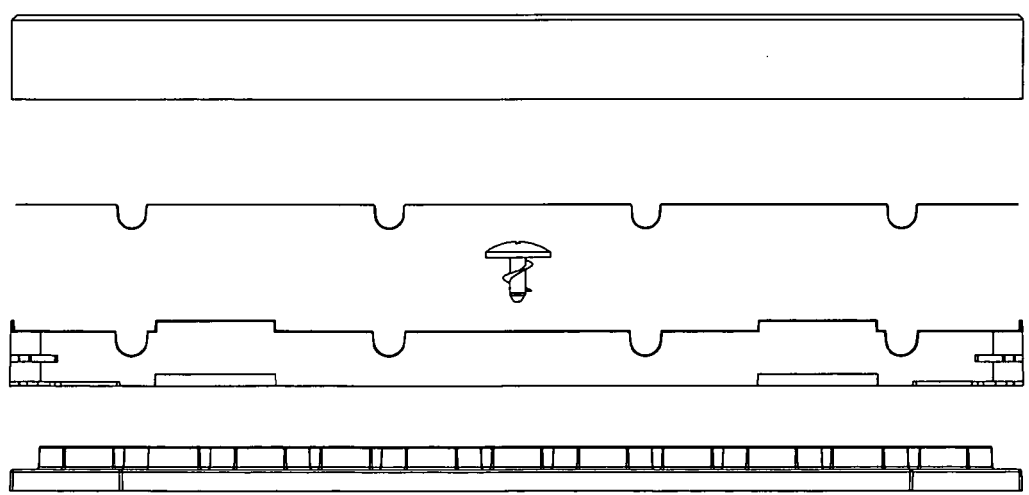
FIG. 16 is a side view of FIG. 15.
Figure 17:
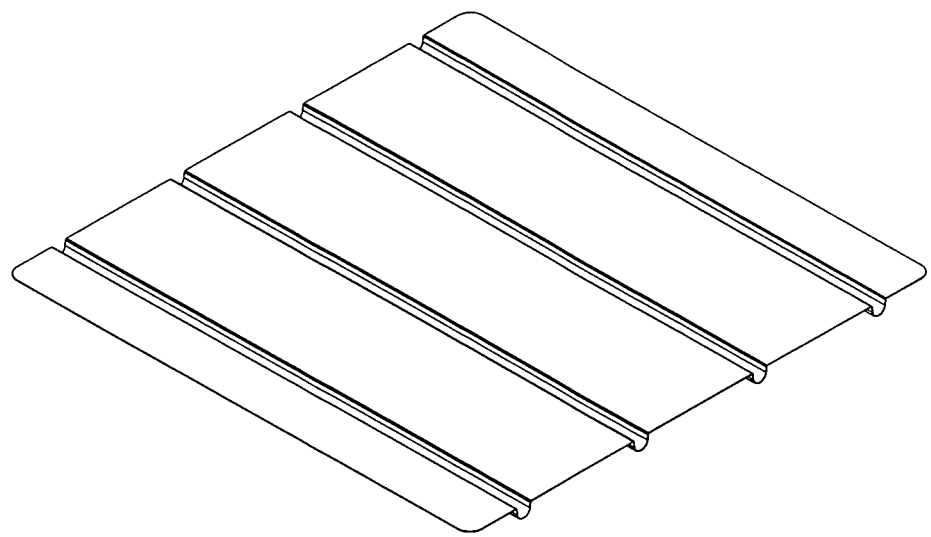
FIG. 17 is a perspective view of an aluminum tray.
Figure 18:
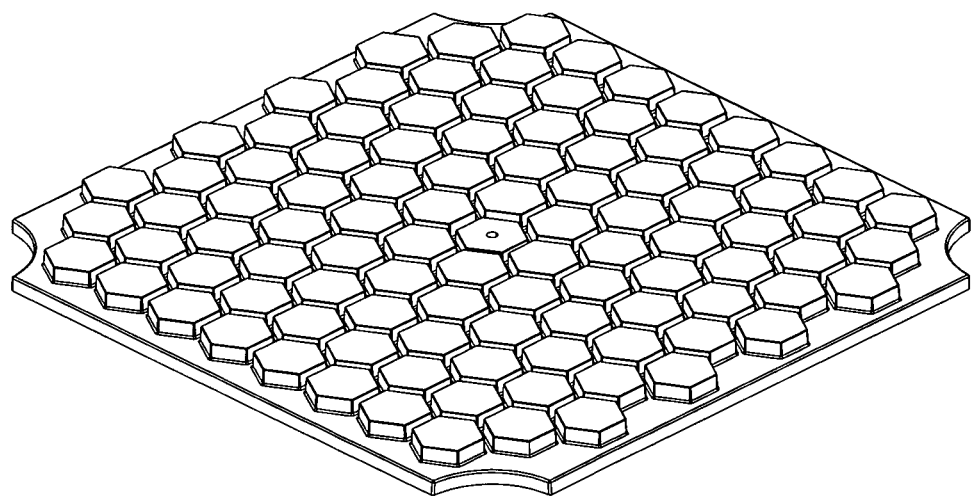
FIG. 18 is a perspective view of a foam tray.

In a preferred embodiment, the hextray 7000 may be used to provide a heat exchanger to a paver for heating or cooling a paver surface. FIG. 15 is an exploded view of a hextray with a heat exchange configuration. FIG. 16 is a side view of the exploded hextray 7000 configuration. As shown, insulation (shown in FIG. 18) may be provided to the bottom of the hex board and secured to the hextray 7000 via a screw with large threads for gripping the insulation and retaining the insulation against the hextray 7000. Referring to FIG. 18, the insulation is a pad with hexagonal protrusions that insert into the hexagonal apertures of the hexagon lattice. An aluminum or other heat conducting metal plate with tubing lanes may suitably be positioned on top of the hextray so that the tubing lanes are disposed within the tubing track of the hextray 7000 (see FIG. 19). Tubing (not shown) may be provided through the tubing lanes and connected to a hot or cold water source and discharge. Finally a paver may be positioned above the tubing and aluminum plate.

When constructed as shown in FIGS. 15 and 16, the hextray operates as a heat exchanger for the paver. For cooling a paver surface, cool water may be provided to the tubing so that heat may be conducted through the paver surface, along the heat conducting plate and into the water. For heating a paver surface, hot water may be provided to the tubing for the opposite heat flow. Suitably, the insulation keeps heat from being lost below the hextray 7000.

Although water through tubing is described as the heat transfer mechanism, in an alternate embodiment, a refrigeration unit may be applied to the hextray. In a preferred embodiment, the refrigeration unit is similar to the one disclosed in U.S. Pub. Pat. App. No. 2012/0298331 (published Nov. 29, 2012). In a preferred embodiment, the refrigeration will comprise an aluminum plate with capillary heat exchangers, wherein the plate features hexagonal male inserts that will register in the hexagonal holes of hextray. In other words, the system may be outfitted with a heat exchanging aluminum plate or heat exchanging panel that will fit and align with the hexagonal structures of the tray.

Figure 20:
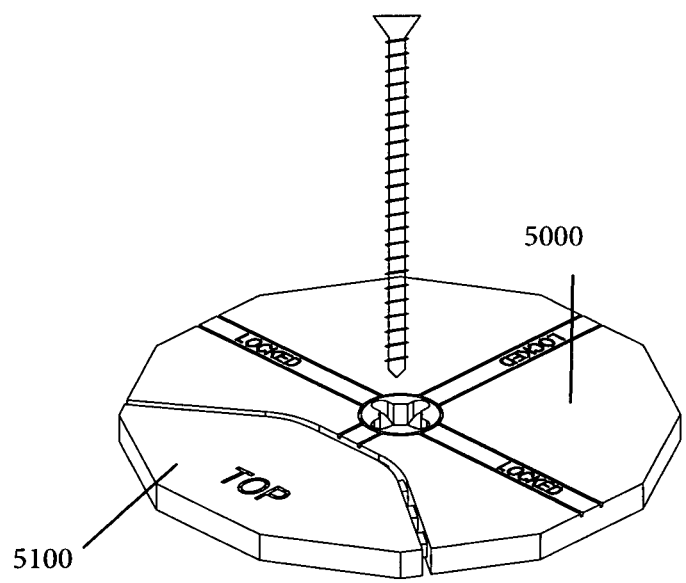
FIG. 20 is a perspective view of a locking disk.
Figure 21:
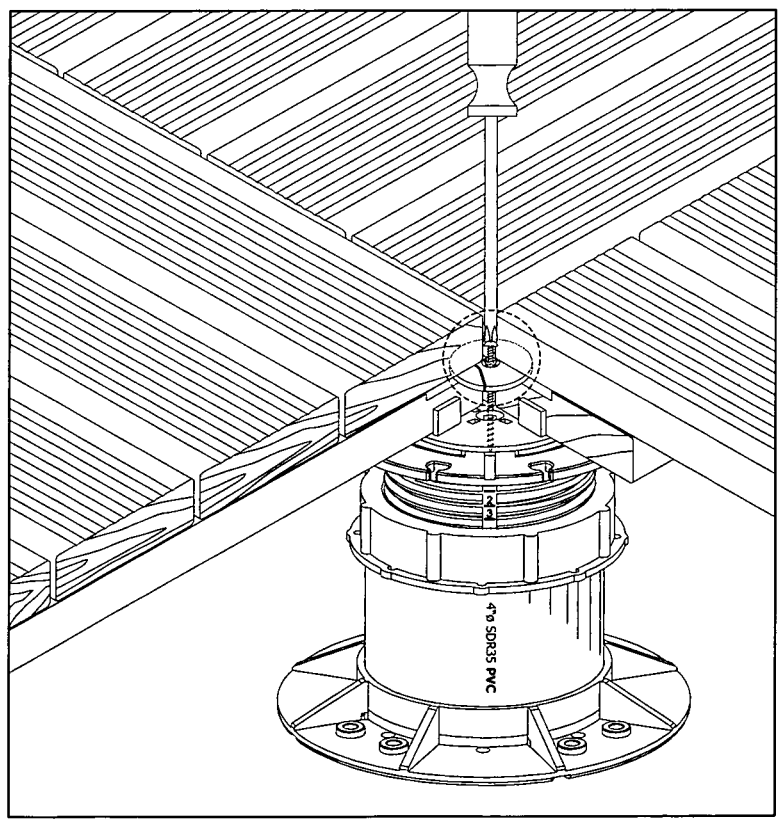
FIG. 21 is an environmental view of the locking disk.
Figure 22:
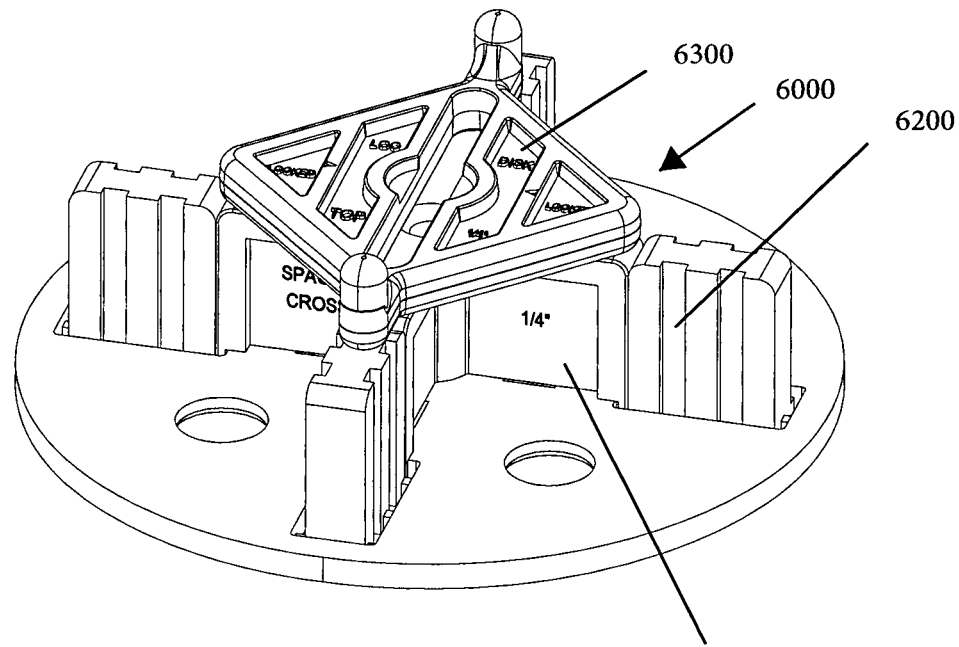
FIG. 22 is a view of a locking slider.

FIGS. 20 and 21 are respectively a view of a locking disk 5000 for securing tiles and an environmental view of the same. As shown in FIG. 20, the disk is circular and features a screw for anchoring the disk 5000 to a pedestal. As shown, the disk 5000 suitably features a break-away portion 5100, with perforation so that said portion 5100 may be broken off or folded away. In general, the disk 5000 may be inserted into corner slots of four adjacent tiles and secured to a pedestal, as shown in FIG. 21. Suitably, the disk 5000 feature indicia so that a user may, by looking between two adjacent tiles, identify when the disk is properly positioned. In one embodiment, the disk may feature teeth for a screwdriver (Phillips or flat head) so that the disk 5000 can be turned when in installed between pavers. A screw may be provided through the center of the disk for anchoring the disk to the pedestal. When the break-away portion of the disk is broken, bent or folded along the perforations, the locking disk suitably operates like the anchoring washer disclosed by U.S. Pat. No. 8,302,356 (issued Nov. 6, 2012), and that patent is hereby incorporated by reference. In a preferred embodiment, the disk 5000 is constructed of plastic.

Instead of a locking disk or anchoring pavers or tiles to the support surface of a pedestal, sliding attachment may be used for that purpose. FIGS. 22 through 25 respectively illustrate perspective, alternate perspective, top, and side views of an attachment for a paver support surface of a pedestal 6000. Referring to these figures, the attachment 6000 is generally a disc adapted for placement within an attachment receptacle of a pedestal's paver support surface whereby the disc and pedestal surface establish a paver support plane. The attachment 6000 is preferably retained within the receptacle via the locking means 6100 deflectively inserting into an aperture until its nibs snap into restrictive interface with the rim of the aperture for restricting the removal of the attachment 6000. As seen in FIGS. 22 through 25 the attachment features projections 6200 that operate to divide the surface 300 into evenly spaced paver receptacles whereby pavers provided to the pedestal may be uniformly oriented and spaced. For example, a paver may be supported above a subsurface via: positioning a pedestal on a subsurface; installing the attachment 6000 on the pedestal's support surface in the manner disclosed above, rotating the attachment 6000 until the orientation of the projections 6200 align with planned paver surface, and providing a corner of the paver to the surface support surface whereby the sides of the paver abut the projections 6200. See also FIG. 26 wherein the depicted pavers 10 are supported, spaced, and oriented by a component fitted with the attachment 6000. In a preferred embodiment, the spacers 6200 define a spacer cross 6400 for dividing the paver support surface of a pedestal into quadrants.

Figure 23:
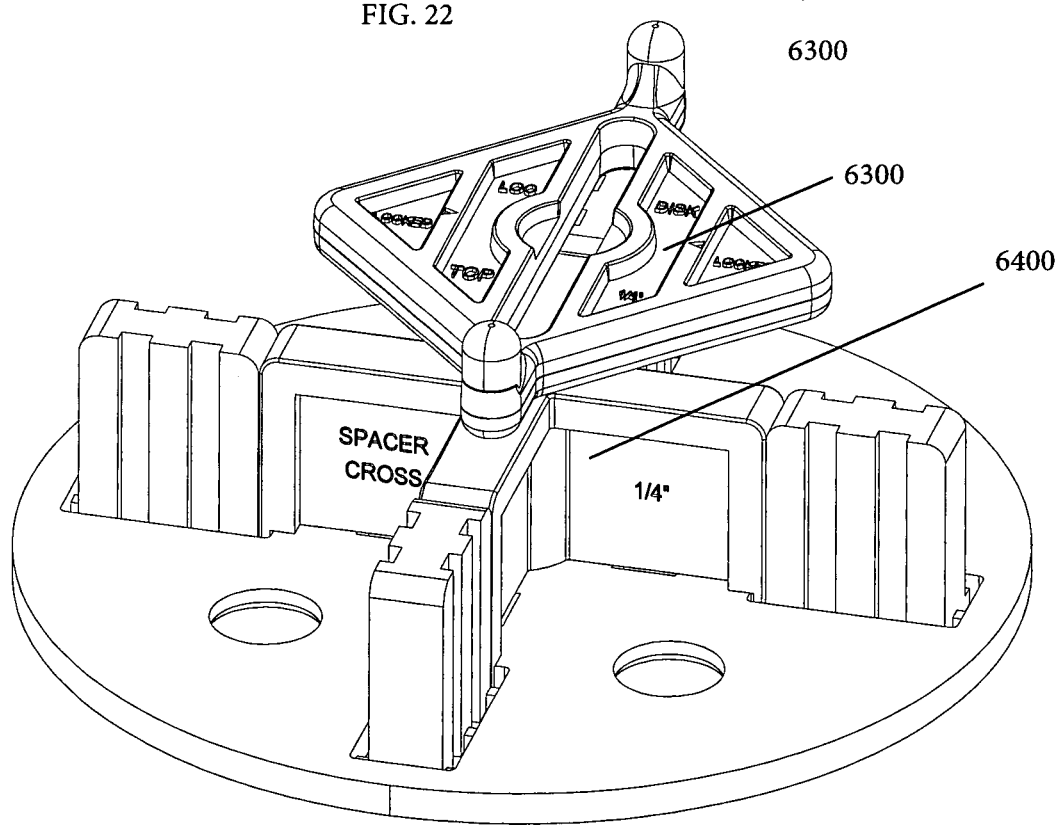
FIG. 23 is a view of a locking slider.
Figure 24:
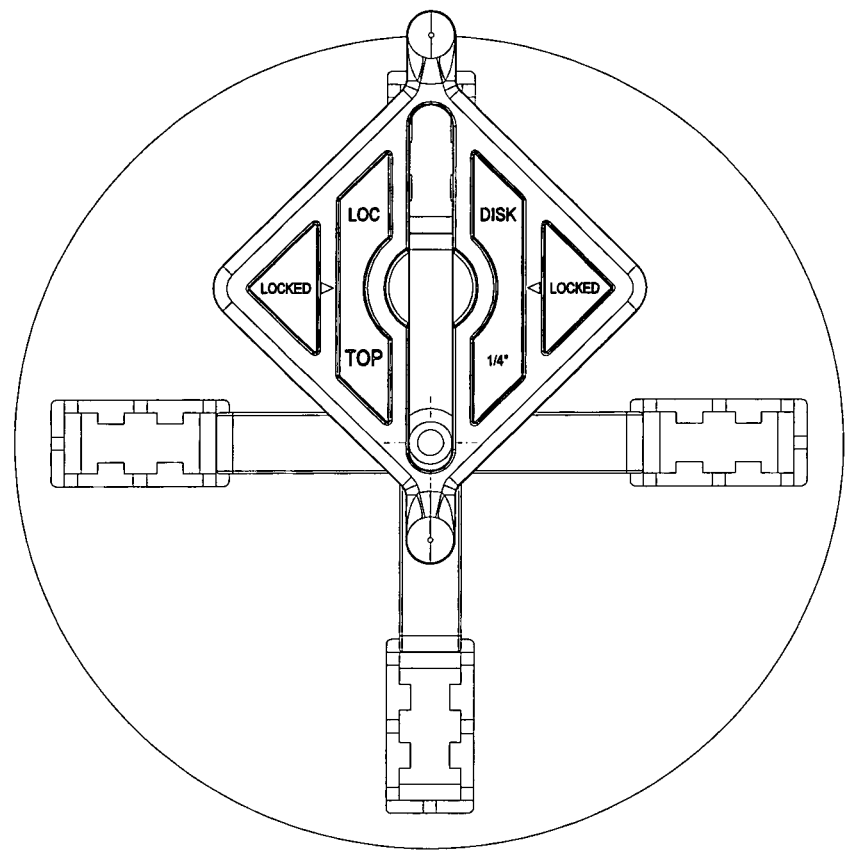
FIG. 24 is a view of a locking slider.
Figure 25:
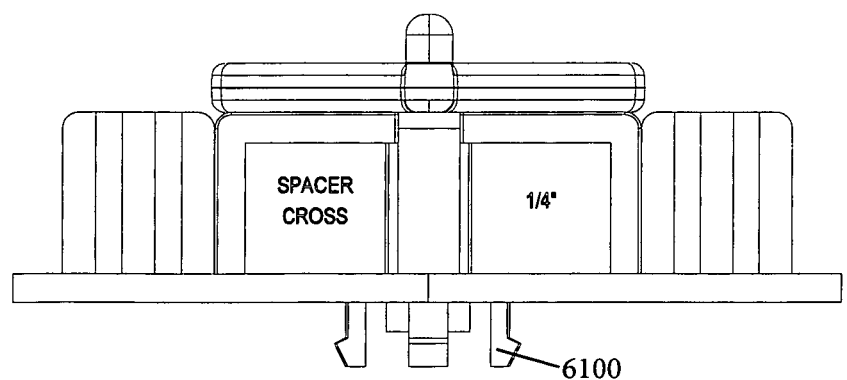
FIG. 25 is a view of a locking slider.
Figure 26:
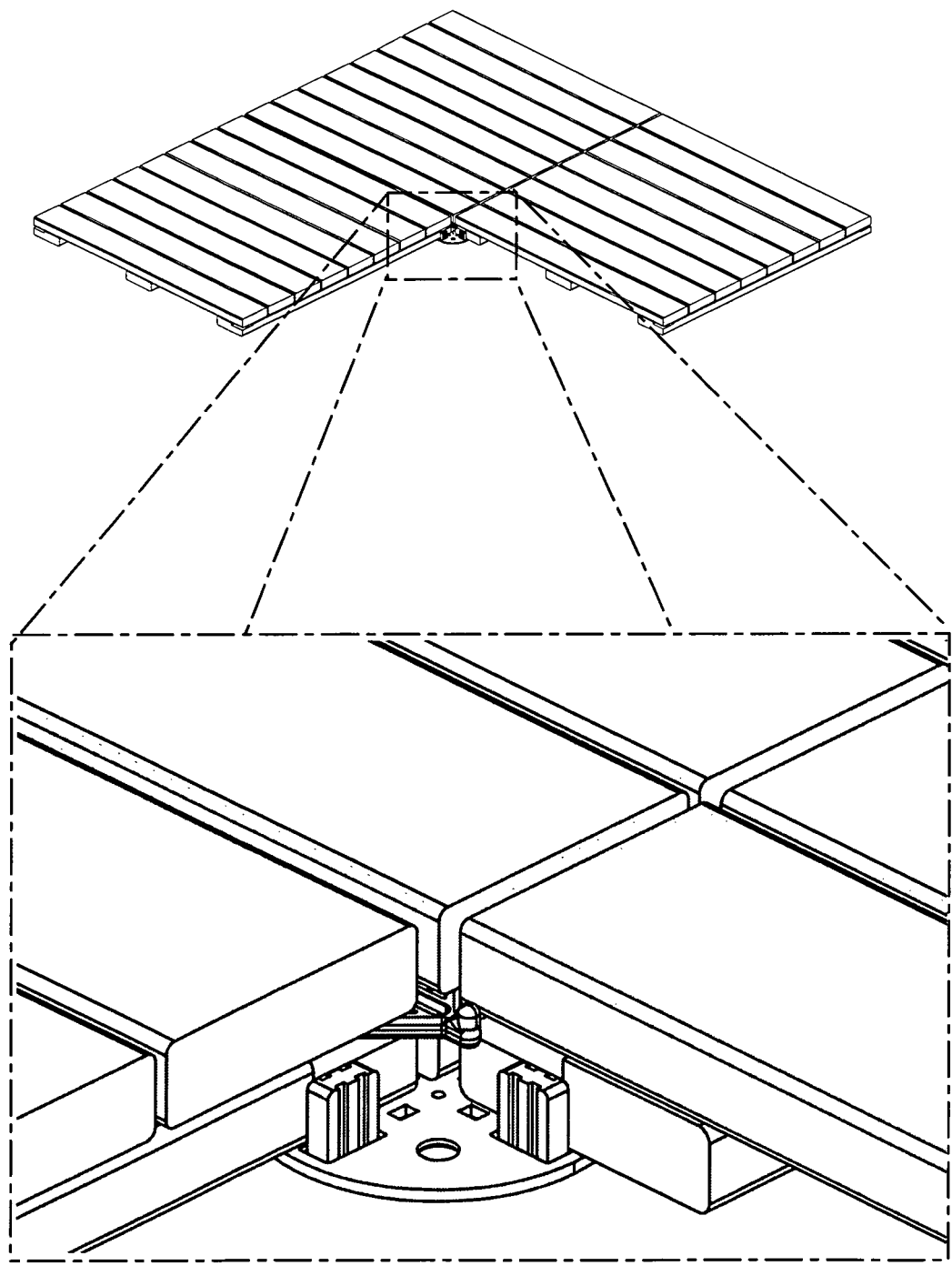
FIG. 26 is a view of a locking slider.

Referring now to FIG. 26, a slider 6300 may suitably be positioned on the projections 6200 so that the slider may suitably be provided to a slot in a paver corner whereby the paver is anchored to the pedestal. Wither reference to FIGS. 22 and 23, the slider 6300 may be slidable between three locations: (1) a first side of the spacer cross 6400 (FIG. 23); (2) the center of the spacer cross 6400 (FIG. 22); and (3) the opposite side of the spacer cross 6400 (opposite of FIG. 23). Referring again to FIG. 26, two pavers may be provided to the first side of the paver cross 6400, the slider slid into the first position, two pavers may be placed on the other side of the paver cross 6400 and the slider 6300 slid to the center position whereby the pavers are anchored to the pedestal (FIG. 26).

It should be noted that the dimensions of the projections 6200, slider 6300 and spacer cross 6400 will vary depending on the desired paver spacing for the planned paver surface. It should be noted: although the locking means is depicted as a projection with a nib for restrictive interaction with an aperture rim, any number of suitable locking means may be used. Such locking means will be known by those of skill in the art, and may include, but should not be limited to, snaps, buttons, bolts, screw and nut mechanisms, and the like (e.g., a screw projecting downward for threaded entry into the aperture 117). Such materials will be readily known to one of skill in the art, and may include, without being limited to: plastics, polymers, PVC, polypropylene, polyethylene; metals; woods; ceramics; composites and other synthetic or natural materials whether molded, extruded, stamped or otherwise fabricated. Finally, it should further be noted that, the dimensions of the attachment 6000 will vary with the size of the paver to be retained by the pedestal. In particular, the height of the projections may vary depending on the thickness of a paver, e.g. in a range of about 0 to 20 inches.

An apparatus comprised of an above disclosed component may be used to compensate for variations in the slope of the undersurface with regard to the leveling of a paver surface. It should be noted that FIGS. 1 through 26 and the associated description are of illustrative importance only. In other words, the depiction and descriptions of the present invention should not be construed as limiting of the subject matter in this application. Additional modifications may become apparent to one skilled in the art after reading this disclosure.

I claim:

1. A paver tray comprising:
   a frame with at least one corner;
   a hexagon lattice within the frame, said lattice defining a paver support surface on one side and an underside, wherein all of the hexagons in the hexagon lattice define hexagonal apertures except one center hexagon that is substantially solid;
   a tubing track in the hexagon lattice; and,
   a slot in the at least one corner for receiving a locking means.

2. The paver tray of claim 1 further comprising a locking disk installed in said slot.

3. The paver tray of claim 1 further comprising a locking slider installed in said slot.

4. The paver tray of claim 1 further configured to exchange heat with a paver.

5. The paver tray of claim 4 wherein:
   insulation is attached to said underside of the hexagonal lattice via securement to said center hexagon.

6. The paver tray of claim 5 further comprising a heat conducting plate with at least one tubing lane deposited into said tubing track.

7. The paver tray of claim 6 wherein a paver is positioned on said heat conducting plate.

8. The paver tray of claim 1 installed on a pedestal.

9. The paver tray of claim 2 wherein the locking disk is defined by a disk with a break away portion.

10. The paver tray of claim 9 wherein the breakaway portion is defined by a perforated seam.

11. The paver tray of claim 1 wherein the locking means comprises:
    a disk adapted for placement within an attachment receptacle of a paver support pedestal;
    a spacer cross on said disk; and,
    a slider that is slidably attached to said spacer cross.

12. The paver tray of claim 8 wherein said pedestal features a slope compensation pad defined by at least two slope compensation panels, each of said panels comprising:
    a top surface that defines a first plane;
    an underside surface that defines a second plane; and,
    wherein said first plane and second plane are oblique relative to each other.

13. The paver tray of claim 12 wherein a first and second panel are stacked so that the top surface of the first panel interfaces with the bottom surface of the second panel.

14. The paver tray of claim 13, wherein the plane of the top surface of the second panel and the plane of the bottom surface of the first panel are parallel.

15. The paver tray of claim 13, wherein the plane of the top surface of the second panel and the plane of the bottom surface of the first panel are not parallel.

16. The paver tray of claim 13 wherein the first and second panel are rotatable relative to one another.

\* \* \* \* \*